United States Patent
Berne

(10) Patent No.: US 11,951,907 B2
(45) Date of Patent: Apr. 9, 2024

(54) IMAGE CAPTURING ARRANGEMENT FOR A MOTOR VEHICLE AND A MOTOR VEHICLE COMPRISING AN IMAGE CAPTURING ARRANGEMENT

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/799,008

(22) PCT Filed: Feb. 18, 2020

(86) PCT No.: PCT/EP2020/054231
§ 371 (c)(1),
(2) Date: Aug. 11, 2022

(87) PCT Pub. No.: WO2021/164851
PCT Pub. Date: Aug. 26, 2021

(65) Prior Publication Data
US 2023/0067200 A1     Mar. 2, 2023

(51) Int. Cl.
*B60R 1/00*     (2022.01)
*B60R 11/00*    (2006.01)
(Continued)

(52) U.S. Cl.
CPC ............... *B60R 1/00* (2013.01); *H04N 23/51* (2023.01); *H04N 23/57* (2023.01); *B60R 2011/0085* (2013.01)

(58) Field of Classification Search
CPC ... B60R 1/00; B60R 2011/0085; H04N 23/51; H04N 23/57
See application file for complete search history.

(56) References Cited

U.S. PATENT DOCUMENTS 9,129,495 B1     9/2015  Stewart et al.
2010/0110192 A1  5/2010  Johnston et al.
(Continued)

FOREIGN PATENT DOCUMENTS

CN      106627370 A       5/2017
DE   202005013989 U1     11/2005
(Continued)

OTHER PUBLICATIONS

International Search Report and Written Opinion for International Patent Application No. PCT/EP2020/054231, dated May 8, 2020, 13 pages.

*Primary Examiner* — Farzana Hossain
(74) *Attorney, Agent, or Firm* — Withrow & Terranova, PLLC

(57) ABSTRACT

An arrangement for capturing an image of a vehicle external area by a sensor which can be linked with an image displaying system in a vehicle cabin, the arrangement having
  a rotating housing connected to a vehicle body panel, operable between a resting position and operating position,
  a sensor disposed within the housing, and
  an actuation mechanism configured to place the sensor in a concealed position when the housing assumes its resting position and configured to place the sensor in an open position when the housing assumes its operating position allowing the sensor to capture an image of a vehicle external area. According to a second aspect, the invention concerns a vehicle comprising the image capturing arrangement.

10 Claims, 3 Drawing Sheets

(51) Int. Cl.
*H04N 23/51* (2023.01)
*H04N 23/57* (2023.01)

(56) References Cited

U.S. PATENT DOCUMENTS

2011/0267466 A1   11/2011  Brester
2017/0244902 A1*  8/2017  DiMenichi ............ H04N 23/50

FOREIGN PATENT DOCUMENTS

| EP | 2163429 A2 | 3/2010 |
| EP | 3248842 A1 | 11/2017 |
| KR | 20140038000 A | 3/2014 |
| WO | 2014041153 A1 | 3/2014 |

* cited by examiner

IMAGE CAPTURING ARRANGEMENT FOR A MOTOR VEHICLE AND A MOTOR VEHICLE COMPRISING AN IMAGE CAPTURING ARRANGEMENT

This application is a 35 USC 371 national phase filing of International Application No. PCT/EP2020/054231, filed Feb. 18, 2020, the disclosure of which is incorporated herein by reference in its entirety.

TECHNICAL FIELD

The invention relates to an image capturing arrangement for a motor vehicle, and a vehicle comprising such an image capturing arrangement.

The invention can be applied in heavy-duty vehicles, such as trucks, buses and construction equipment. Although the invention will be described with respect to a truck, the invention is not restricted to this particular vehicle and may be used in other working machines.

BACKGROUND

A trend in vehicles and especially in industrial vehicle is to provide data and specifically images of the vehicle environment to provide a driver with information on the vehicle environment.

Due to the size and elevated driver positions of trucks, a blind spot often exists to the area which is located at the vehicle front.

To give the driver some vision on this area, it is known to mount a mirror known as a class VI mirror over the driver windscreen so that the truck front area can be seen by the driver.

However, a mirror positioned on a vehicle cab over the windscreen has a detrimental effect on the vehicle drag and ultimately can increase fuel consumption.

It is known by WO 2014/041153 to provide a sensor for monitoring a sector around a cab which has also a detrimental effect on the vehicle drag and ultimately can increase fuel consumption Alternatively, a camera can be integrated on the vehicle dashboard behind the windscreen and directed to the front of the vehicle. However, in that embodiment, the field of view of the camera is not satisfying.

Therefore, there is a need for improvement driver's visibility.

SUMMARY

An object of the invention is to provide an arrangement which makes it possible to reliably acquire images of the outside environment of a vehicle and specially the area which at the front of vehicle, and at the same time has a limited impact on the vehicle aerodynamic capability.

According to a first aspect, the invention relates to an arrangement for capturing an image of a vehicle external area by a sensor which can be linked with an image displaying system in a vehicle cabin, the arrangement having:
 a rotating housing connected to a vehicle body panel, operable between a resting position and operating position,
 a sensor disposed within the housing and
 an actuation mechanism configured to place the sensor in a concealed position when the housing assume its resting position and configured to place the sensor is an open position when the housing assumes its operating position allowing the sensor to capture an image of a vehicle external area.

Thus, the invention provides an arrangement for capturing an image of an area surrounding a vehicle, the area in question being, for example, the vehicle front part. The arrangement according to the invention (i) makes it possible to provide additional data on an area surrounding a vehicle when needed while having a limited impact on the vehicle drag when not needed and (ii) make it further possible to protect the sensor when not needed and expose the sensor when needed thereby ensuring that the images captured by the sensor are of constant good quality.

Additional measures of the invention can include in a separate or combined manner:
 the image capturing arrangement can includes a shaft which connects the actuation mechanism and the rotating housing,
 the housing can include an opening and the actuation mechanism can be configured to position the sensor in coincidence with the opening when the housing rotates into its operational position,
 the image capturing arrangement can include a single motor that drives the shaft whereon the housing is secured, the rotation of shaft driving (i) the housing between its resting position and its operation position and driving (ii) the actuation mechanism so that the sensor slides between its concealed position and its open position,
 in an embodiment, the actuation mechanism can include a cam and a cam follower, a rod connected to the cam follower at one end and connected to the sensor at the other end,
 the cam can be preferably secured on the shaft,
 in another embodiment, the actuation mechanism can include a rod connected to the shaft, at one end, and connected to the sensor, at the other end and includes guiding means guiding the sensor between its concealed position and its open position,
 preferably, the sensor guiding means can include a two grooves having parallel distal portions, one the grove having a curved portion substantially facing the opening and two pins fitted on the sensor, each pin being engaged a groove,
 in another embodiment, the actuation mechanism can include a moveable panel and two connecting rods, the two rods being at one end connected to the shaft and the other end connected to the moveable panel, so that the rotation of the shaft drives the moveable panel between a closed position where the moveable panel closes the opening and an open position when the moveable panel slides away from the opening,
 the image capturing arrangement can include an electronic control unit (ECU) configured to activate the motor to rotate the housing and activate the actuating mechanism according to a vehicle parameter of the group comprising: vehicle speed and vehicle environment.

According to a first aspect, the invention relates the a motor vehicle, such as a truck, comprising an outer body panel defining a cab and an image displaying system provided in the cab and an arrangement for capturing an image of a vehicle external area by a sensor which can be linked with the image displaying system, the arrangement having:
 a rotating housing connected to a vehicle body panel, operable between a resting position where the rotating housing leans against the outer panel and an operating position where the rotating housing forms an angle with the outer body panel a sensor disposed within the housing and an actuation mechanism configured to place the sensor in a concealed position when the housing assume its resting position and configured to place the sensor in an open position when the housing assumes its operating position allowing the sensor to capture an image of a vehicle external area.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

DETAILED DESCRIPTION OF EXAMPLE EMBODIMENTS OF THE DISCLOSURE

Figure 1:
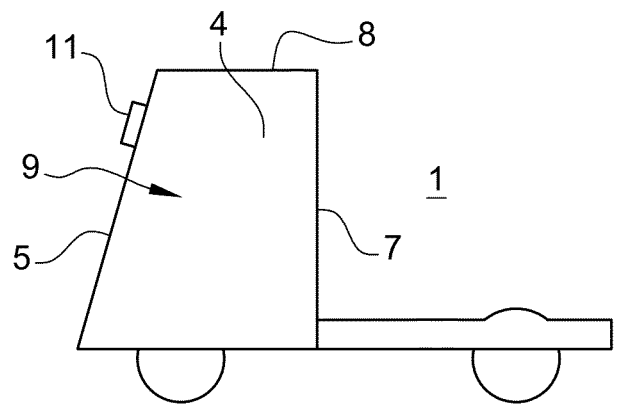
FIG. 1 is a schematic view of a truck comprising an image capturing arrangement in its resting position.

FIG. 1 shows schematically a motor vehicle, for example a truck 1, comprising a vehicle cabin 4. The cabin 4 can comprise a front panel 5, a back panel 7 a roof panel 8 and two lateral panels 9.

Figure 2:
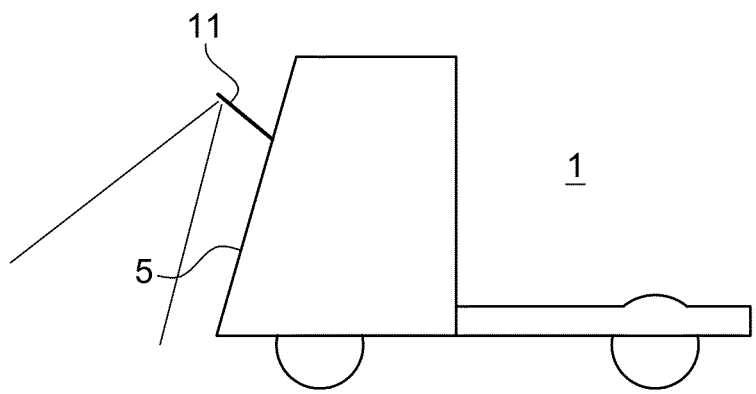
FIG. 2 is a schematic view of the truck of FIG. 1 where the image capturing arrangement is its operational position.

FIG. 1 and FIG. 2 show an image capturing arrangement 11 mounted on the front part 5 of the cabin 4 of the truck 1. The image capturing arrangement 11 is configured to be placed outside of the cabin 4. The image capturing arrangement 11 is located on the upper part of the cabin 4 and, preferably, above the cabin front windscreen. The image capturing arrangement can also be secure on the roof panel 8 overlooking the vehicle front area.

As it is apparent from FIG. 1 and FIG. 2, the image capturing arrangement 1 is movable between a resting position (FIG. 1) and an operational position (FIG. 2).

In the resting position, the image capturing arrangement 1 leans against the vehicle front part 5 and in the operational position the image capturing arrangement 11 is swivelled with regard to the vehicle front part 5. While, in the illustrated example of FIG. 2, the image capturing arrangement 11 is swivelled downward by an angle of less than 90°, it is understood that the image capturing arrangement 11 can be tiled upwards or sideways with any suitable angle. When the image capturing arrangement 11 assumes its operational position, an image of the vehicle external area is captured and can be displayed on a suitable image displaying system within the cabin of the vehicle The image capturing arrangement 11 according to an embodiment is shown on FIG. 3. The image capturing arrangement 11 comprises a rotating housing 13 which has an elongated shape. The housing 13 is rotatably supported on a shaft 15 which is itself secured on the vehicle front panel 5. The shaft 15 can be oriented in different way with regard to the vehicle. The shaft 15 can be suitably linked to a motor 21 which takes care of the rotation of the housing 13 between the resting position and the operational position.

Inside of the housing 13, the image capturing arrangement 11 includes a sensor which can be a camera 15 which is connected to an actuating mechanism 16.

Figure 3:
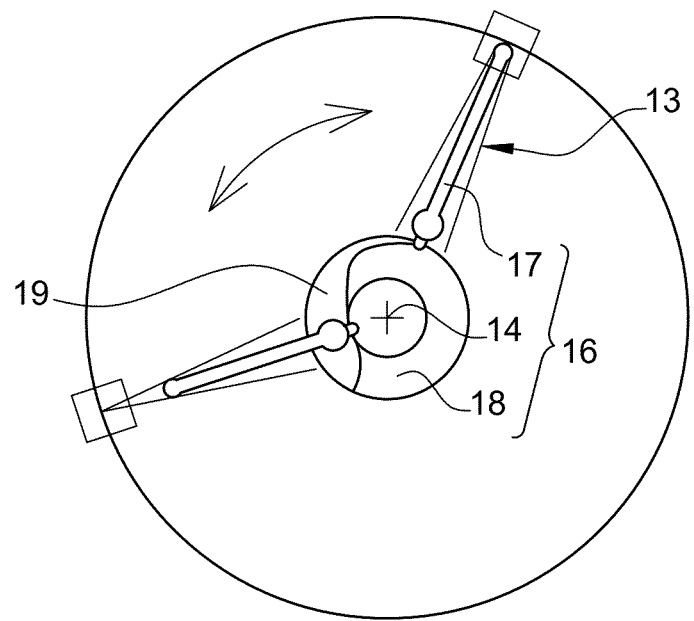
FIG. 3 represents in a schematic manner the image capturing arrangement according to a first embodiment.
Figure 4:
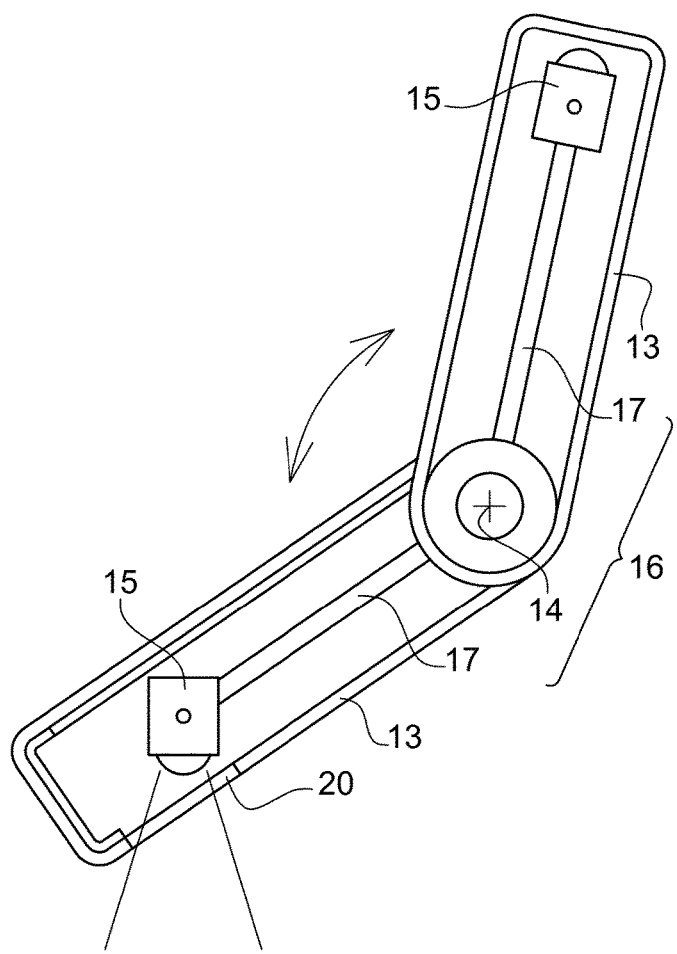
FIG. 4 and FIG. 5 represent the image capturing arrangement of FIG. 3 as a side view and as a front view.
Figure 5:
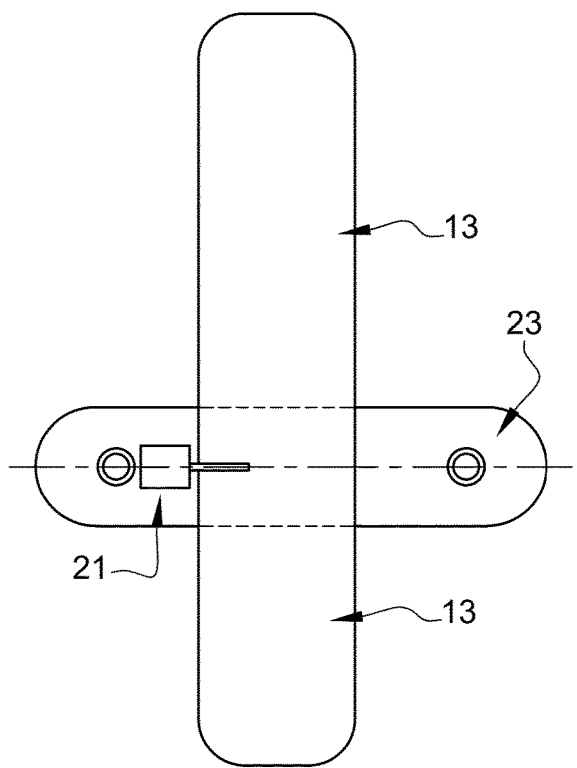

In the embodiment represented on FIGS. 3 to 5, the actuating mechanism 16 can be comprised of a rod 17 which at one end supports the camera 15 and a cam system which is linked the rod 17 second end. As it can be seen on FIG. 3, the cam system includes a cam 18 and a cam follower 19 making it possible to retract the rod 17 and thus the camera 15 which is attached to the rod 17 when the housing 13 rotates between the resting position and the operational. FIG. 3 and FIG. 4 show the arrangement of the invention in both the resting position and the operational position.

In the resting position of the image capturing arrangement 11, the camera 15 is concealed in the housing 13 and therefore is protected from weather conditions (rain, snow, frost . . . ) while in the operational position the camera is an open position as the camera is positioned above a window 20 provided in the housing and therefore can capture images of the area in front of the vehicle.

One can note that the image capturing arrangement 11 relies a one rotation which simultaneously and in a synchronised manner swivels the housing 13 between its resting position and its operating position and moves the camera 15 between its concealed position and its open position.

FIG. 5 shows a front view of the image capturing arrangement 11 where it can be appreciated that the shaft 14 is driven be a single electric motor. FIG. 5 also shows a bracket 23 which makes it possible to secure the image capturing arrangement 11 onto a vehicle panel such a vehicle front panel 5.

In the embodiment of FIG. 4; the housing 13 can be provided with a seal 22 which tightly surrounds the camera 15 when the camera 15 is in its concealed position. The camera 15 is thus isolated from the environment and remains fully operational. It can be envisaged to provide the actuation mechanism 16 with an elastic element such as a spring to bias the camera 15 into a position where the camera field vision is optimized.

Figure 6:
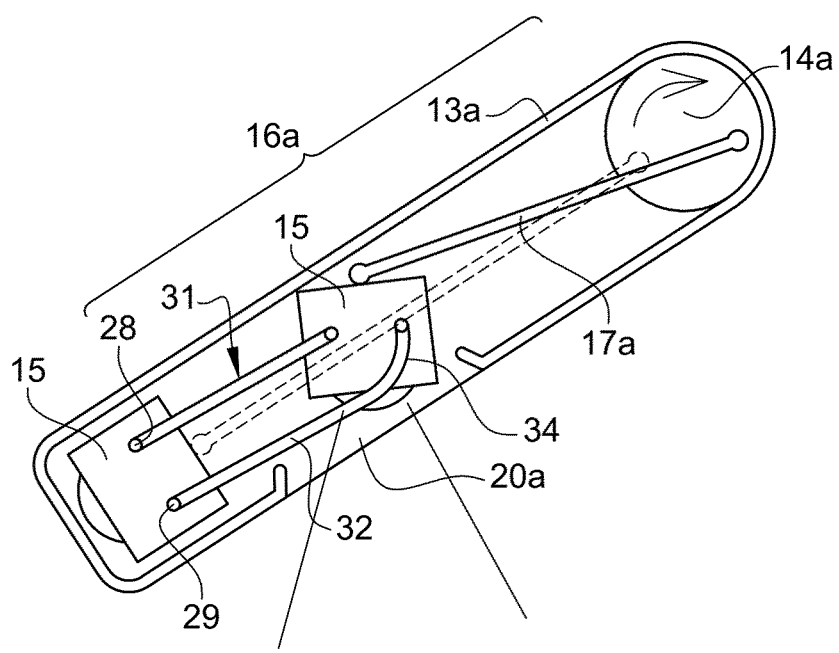
FIG. 6 represents the image capturing arrangement according to a second embodiment.

Another embodiment of the invention is shown on FIG. 6. In this embodiment of the image capturing arrangement 11, the housing 13a is provided with a lateral opening 20a and the sensor which can be a camera 15 is driven between its concealed position and its open position by an actuating mechanism 16a; the actuating mechanism 16a can drive the camera between its concealed position (shown in dotted line) and its open position (shown in plain line) where the position of the camera 15 coincides with the opening 20a.

In the embodiment shown on FIG. 6, the actuating mechanism 31 can comprise a shaft 14a and a connecting rod 17a. The connecting rod 17a is mounted on the shaft 14a on one end, at a radial distance from the center of the shaft 1. At its another end, the connecting rod 17a is rotationally secured onto the camera 15.

The translation of the camera 15 under the action of the connecting rod 17a is guided by guiding means. In the illustrated embodiment, on each of its side, the camera 15 is further equipped with two pins 28 and 29 which each engage into two grooves provided in the internal surface of the housing 13a. The grooves can be comprised of two parallel portions 31 and 32 towards the distal end of the housing 13a and of a proximal curved portion 34 which is substantially facing the opening 20a.

In other words, when the camera 15 is displaced by the connecting rod 17a between its concealed position (in dotted lines) and its open position (in plain lines), the camera 15 is first displaced along a translation as the grooves 31 and 32 are parallel and is then rotated as the pins 29 follows the curved portion 34 of the groove 31. This allows the camera 15 to assume its open position where the camera 15 is oriented toward the lateral opening 20a and the camera field of vision projects though the lateral opening 20a.

Figure 7:
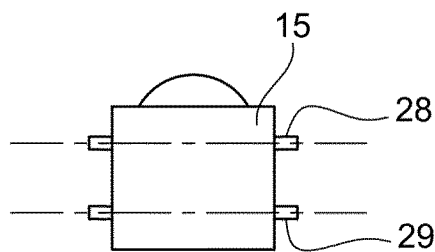
FIG. 7 shows a camera taken from the embodiment of FIG. 6
Figure 8:
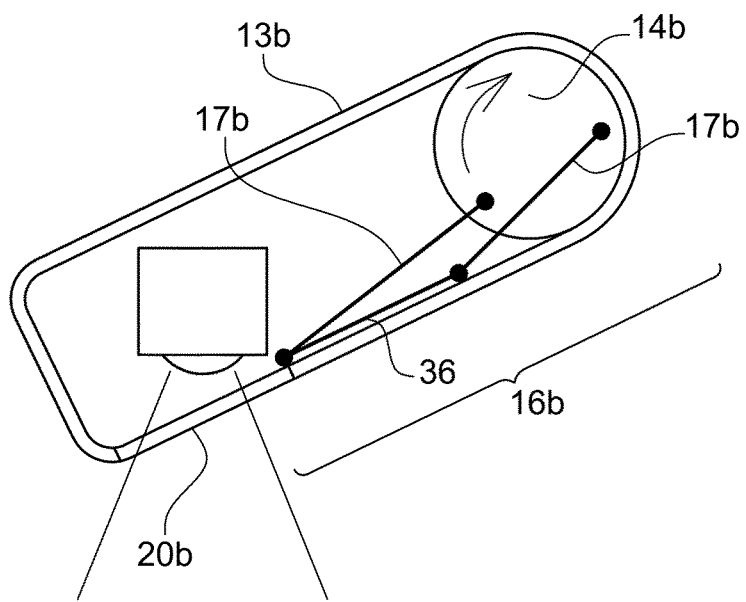
FIG. 8 represents the image capturing arrangement according to a third embodiment.

Another embodiment of the image capturing arrangement is shown on FIG. 7. In this embodiment, the camera 15 is fixedly mounted in the housing 13b and the actuation mechanism 16 controls a moveable panel 36.

The moveable panel 36 is configured to slide between a retracted position (in plain line) and an extended position (in dotted lines). In the extended position of the moveable panel 36, the camera 15 assumes its concealed position as the moveable panel 36 closes the opening 20 provided in the housing 13b. In the retracted position of the movable panel 36, the camera 15 assumes its open position as the moveable panel 36 is retracted and the camera 15 can thus project through the opening 20b. In this embodiment the actuating mechanism 16 comprises two rods 17b mounted on the shaft 14b, at a distance from the center of the shaft 14b. The tow rods 17b are mounted on the shaft 14b at locations substantially diameteraly opposite.

One connecting rod 17b is fixed onto one end of the panel 36, and the other connecting rod 17b is fixed to the other end of the panel 36a. When the panel 36 is moved in the extended position, the opening 20b becomes unobstructed. When the panel 19a is moved in the retracted position, the panel 36 closes the opening 20b.

The actuation mechanism 16 which allows the camera 15 to assume its concealed position and its open position is set in motion when the housing 13b rotates between its resting position and its operating position. In other words, the actuation mechanism 16b does not required a separate actuation source. The electric motor which drives the rotation of the housing 13b is used to set the actuation mechanism in motion.

The image capturing arrangement can comprise an ECU which may be programmed to activate the motor 21 so as to move the housing 16,16a,16b from the resting position to the operation position according one or more parameters such as the vehicle speed or the vehicle environment (urban environment or open road) which can be provided by the vehicle GPS system.

When the truck 1 moves at low speed typically when the truck is manoeuvring or is driving in urban area where the driver may need some additional data on the immediate area surrounding the vehicle, the data captured by the camera 15 are displayed on a vehicle display monitor on the vehicle dashboard.

When the truck 1 drives at a significant speed such as on a motorway, the driver needs a long distance vision and the driver vision of areas directly surrounding the vehicle is less relevant. In such driving conditions the ECU is programmed to set the image capturing arrangement 11,11a,11b in its resting positon. In its resting position the image capturing arrangement 11,11a,11b leans against the cabin front panel; in this configuration, the image capturing arrangement 11,11a,11b has a minor impact on the vehicle drag. Furthermore, in the resting position, the camera 15 which is protected from the weather and other contamination remains in a clean state and can therefore be fully and reliably operational when needed.

It is to be understood that the present invention is not limited to the embodiments described above and illustrated in the drawings; rather, the skilled person will recognize that many changes and modifications may be made within the scope of the appended claims.

The invention claimed is:

1. An image capturing system for capturing an image of a vehicle external area, the image capturing system comprising:
 a rotating housing connected to a vehicle body panel, the rotating housing comprising an opening and being operable between a resting position and an operating position; a sensor disposed within the rotating housing, the sensor being linkable with an image displaying system in a vehicle cabin; and
 an actuation mechanism configured to place the sensor in a concealed position when the rotating housing assumes its resting position and configured to place the sensor in an open position when the rotating housing assumes its operating position allowing the sensor to capture an image of a vehicle external area;
 wherein the actuation mechanism comprises a rod connected to a shaft at one end and to the sensor at another end, and includes a guiding means guiding the sensor between the concealed position and the open position; and wherein the guiding means comprises two grooves having parallel distal portions, one groove having a curved portion substantially facing the opening and two pins fitted on the sensor, each pin of the two pins being engaged with a corresponding groove of the two grooves.

2. The image capturing system of claim 1, wherein the shaft connects the actuation mechanism and the rotating housing.

3. The image capturing system of claim 2, wherein the actuation mechanism is configured to position the sensor in coincidence with the opening when the rotating housing rotates into its operating position.

4. The image capturing system of claim 3, wherein the image capturing system further comprises a single motor that drives the shaft whereupon the rotating housing is secured, the rotation of shaft driving the rotating housing between its resting position and its operating position and driving the actuation mechanism so that the sensor slides between its concealed position and its open position.

5. The image capturing system of claim 3, wherein the actuation mechanism further comprises a cam and a cam follower, the rod being connected to the cam follower at one end and connected to the sensor at the other end.

6. The image capturing system of claim 3, wherein the actuation mechanism further comprises a moveable panel and two connecting rods, the two connecting rods being connected to the shaft at the one end and connected to the moveable panel at the other end, so that the rotation of the shaft drives the moveable panel between a closed position where the moveable panel closes the opening and an open position when the moveable panel slides away from the opening.

7. The image capturing system of claim 4, further comprising an electronic control unit configured to activate the motor to rotate the rotating housing and activate the actuating mechanism based on at least one vehicle parameter including a vehicle speed and a vehicle environment.

8. The image capturing system of claim 5, wherein the cam is secured on the shaft.

9. A motor vehicle including a truck, comprising:
an outer body panel defining a cab and an image displaying system provided in the cab and
an image capturing system for capturing an image of a vehicle external area, the image capturing system comprising:
a rotating housing connected to a vehicle body panel, the rotating housing comprising an opening and being operable between a resting position where the rotating housing leans against the outer body panel and an operating position where the rotating housing forms an angle with the outer body panel;
a sensor disposed within the rotating housing, the sensor being linkable with an image displaying system in a vehicle cabin; and
an actuation mechanism configured to place the sensor in a concealed position when the rotating housing assumes its resting position and configured to place the sensor in an open position when the rotating housing assumes its operating position allowing the sensor to capture an image of a vehicle external area;
wherein the actuation mechanism comprises a rod connected to a shaft at one end and to the sensor at another end, and includes a guiding means guiding the sensor between the concealed position and the open position; and wherein the guiding means comprises two grooves having parallel distal portions, one groove having a curved portion substantially facing the opening and two pins fitted on the sensor, each pin of the two pins being engaged with a corresponding groove of the two grooves.

10. An image capturing system for capturing an image of a vehicle external area, the image capturing system comprising:
a rotating housing connected to a vehicle body panel, the rotating housing comprising an opening and being operable between a resting position and an operating position;
a sensor disposed within the rotating housing, the sensor being linkable to an image displaying system in a vehicle cabin;
an actuation mechanism configured to place the sensor in a concealed position when the rotating housing assumes its resting position and configured to place the sensor in an open position when the rotating housing assumes its operating position allowing the sensor to capture an image of a vehicle external area; and
a shaft that connects the actuation mechanism and the rotating housing,
wherein the housing further comprises an opening and the actuation mechanism is configured to position the sensor in coincidence with the opening when the housing rotates into its operating position,
wherein the actuation mechanism further comprises a moveable panel and two connecting rods, the two rods being connected to the shaft at one end and connected to the moveable panel at another end, so that the rotation of the shaft drives the moveable panel between a closed position where the moveable panel closes the opening and an open position when the moveable panel slides away from the opening.

* * * * *